United States Patent [19]

Gundersen

[11] Patent Number: 4,736,445
[45] Date of Patent: Apr. 5, 1988

[54] MEASURE OF DISTINGUISHABILITY FOR SIGNATURE VERIFICATION

[75] Inventor: Steven C. Gundersen, Carmel, N.Y.

[73] Assignee: International Business Machines Corporation, Armonk, N.Y.

[21] Appl. No.: 820,771

[22] Filed: Jan. 21, 1986

[51] Int. Cl.$^4$ .............................................. G06H 9/00
[52] U.S. Cl. ........................................... 382/3; 382/13
[58] Field of Search ......................... 382/3, 13, 30, 34; 178/19, 20, 18

[56]  References Cited

U.S. PATENT DOCUMENTS

| | | | |
|---|---|---|---|
| 4,028,674 | 6/1977 | Chuang | 382/3 |
| 4,086,567 | 4/1978 | Crane et al. | 382/3 |
| 4,128,829 | 12/1978 | Herbst et al. | 382/3 |
| 4,495,644 | 1/1985 | Parks et al. | 382/3 |
| 4,553,259 | 11/1985 | Chainer et al. | 382/3 |
| 4,562,592 | 12/1985 | Chainer et al. | 382/3 |

OTHER PUBLICATIONS

Liu et al., "Automatic Signature Verification: System Description and Field Test Results", *IEEE Trans. Sys. Man., and Cybern.*, vol. SMC9, No. 1, pp. 35-38, Jan. 1979.
Chainer et al., "Penlift Insertion Reconcilliation Technique for Signature, Verification", *IBM Tech. Disc. Bulletin*, vol. 27, No. 8, p. 4652, Jan. 1985.
Chainer et al., "Improved Technique for Splitting and Aligning Segments Which Allows a Smaller Shift Window Resulting Greater Resist. to Forgery Attempts", *IBM Tech. Disc. Bulletin*, vol. 27, No. 8, p. 4645, Jan. '85.
Chainer et al., "Improved Algorithm for the Correction of the Segmentation of Signatures in a Signature Verification System", *IBM Tech. Disc. Bulletin*, vol. 27, No. 8, p. 4655, Jan. 1985.
Welsh, "The Use of Fast Fourier Transform for the Estimation of Power Spectra: A Method Based on Time Averaging Over Short, Modified Periodgrams", *IEEE Trans. Audio Electroacoustics*, vol. Au15, No. 2, pp. 70-73, Jun. 1970.
Liu, "Reference Design Procedure for Signature Verification", *IBM Tech. Disclosure Bulletin*, vol. 21, No. 1, Jun. 1978. pp. 426-427.

*Primary Examiner*—Leo H. Boudreau
*Assistant Examiner*—Joseph Mancuso
*Attorney, Agent, or Firm*—Douglas W. Cameron

[57]  ABSTRACT

An improved method of signature verification. More specifically, this method maps the values of input measures obtained by comparing a sample signature with a reference signature to a universal scale and combines them to produce a measure of similarity.

17 Claims, 8 Drawing Sheets

MEASURE OF DISTINGUISHABILITY FOR SIGNATURE VERIFICATION

TECHNICAL FIELD

This invention relates to an improved method of signature verification. More specifically, this method maps the values of measures obtained by comparing a sample signature with a reference signature to a universal scale and combines them to produce a measure of similarity.

BACKGROUND OF THE INVENTION

There has always been a need in society for verifying a person's identity for a variety of purposes. Modern day scientific technology has adopted the widespread use of computers and related mechanism for the purposes of giving credit, performing electronic funds transfer, and so forth. In all facets of the financial community including the retail industry, securities industry, banking and the like, sums of money, securities and/or materials are transferred between owners based on the reliance of one person on the purported identity of another. Electronic systems including various cryptographic instrumentalities together with secret identity numbers or keys provide a certain amount of security; however, the amount of security is predicted upon the degree of secrecy with which one is able to secure his own special identification key. Obviously, once a person's key is learned by another, presumably an unauthorized person, the other person may falsely assume his identity for a wide variety of electronic application.

Identity verification by means of written signatures has long been known in the art; however, most known systems have various shortcomings. Simply matching the appearance of two signatures is not satisfactory as expert forgers can usually duplicated the appearance of a person's signature as well as the person himself. The result of this is that when an expert forger is involved, even expert document examiners are frequently unable to discover that the signature is forged.

Recent developments in the field of automatic signature verification such as exemplified by U.S. Pat. No. 3,983,535 of Herbst et al and U.S. Pat. No. 4,128,829 of Herbst et al make the concept of personal identification via computer based signature analysis practical. The invention disclosed in U.S. Pat. No. 3,983,535 is based on the discovery that the accelerations of the stylus, which are proportional to the muscle forces exerted by the signer, are of predetermined consistent durations when forming particular strokes in a habitual signature. The nature of the process gives rise to the various distortions in the time axis; e.g., pauses between sections of the name, skipped strokes, decorative rubrics, and the like. Thus, the signal is marked by regions of high correlation of unknown duration separated by variable regions of low correlation. Accordingly, the invention in the U.S. Pat. No. 3,983,535 dealt with a method of regional correlation which registered these regions based initially on stylus contact and then shifting the regions individually to find the maximal of the correlation function weighted to penalize shifting. The results were then combined to make an overall verification decision.

The signature verification method disclosed in U.S. Pat. No. 3,983,535 was based on a single acceleration parameter of the signature dynamic, but as disclosed in U.S. Pat. No. 4,128,829, an even greater discrimination in the verification operation is possible using two orthogonally disclosed (e.g., X and Y axes) acceleration components together with the pressure patterns which are produced during the writing of the signature and utilizing all three of these individual parameters in the correlation operation. The invention disclosed in U.S. Pat. No. 4,128,829 retains the concept of segmenting the sample and reference signatures, correlating individual segment pairs utilizing a series of successive shifts to obtain the maximum possible correlation, weighting the correlations, and finally combining the individual correlation statistics for all segments. An example of a pen system is disclosed in U.S. Pat. No. 4,142,175 of Herbst et al. This pen produces electrical signals proportional to accelerations along the X and Y axes and an electrical signal proportional to the pen point pressure along the Z axis. The acceleration along the X-axis (Y-axis) is known as an acceleration component. The Z-axis is essentially parallel to the axis of the pen. The most recent development is writing instruments is described in U.S. Pat. No. 4,513,437 to Chainer et al. This patent discloses a pressure and acceleration sensing instrument. The pressure sensing element is axially mounted in the writing instrument. The accelerometer structure comprises bimorph piezoelectric members supported at one end, which are appropriately interconnected to produce two orthogonal acceleration components $A_x$ and $A_y$.

According to the Herbst et al procedure, reference acceleration and pressure signals are stored in memory in the electronic computer. Actually, as will be understood by those skilled in the art, digital representations of the acceleration and pressure signals are stored, and the acceleration and pressure signals produced by the pen when used to write a signature are also digitized so that all the arithmetical processing is performed digitally. In a typical system, when a customer opens an account, a signature acquisition feature on a computer terminal prompts the customer to sign his or her name several times. This produces signature data that is transmitted to the computer which selects the reference signals that are stored. Both the reference signals and the signals from the pen produced by a person whose signature is to be verified are segmented as a function of pen lifts which are detected by the pressure signal becoming zero as described in U.S. Pat. No. 4,553,258 Chainer et al. Pen lifts are critical to good correlation scores as they represent reproducible timing marks in the signature. The segmented acceleration and pressure signals from the pen are then compared with the corresponding reference acceleration and pressure signal segments using the correlation algorithm disclosed in U.S. Pat. No. 3,983,535 to Herbst et al.

A segment shifting technique of maximize the correlation for the segments of acceleration signals is disclosed in U.S. Pat. Nos. 4,562,592 and 4,553,259 of Chainer et al, assigned to the same assignee as the present application and for which the issue fee has been paid. The above application (Ser.No. 567,201) and U.S. Pat. Nos. 3,983,535, 4,128,829, 4,142,175 and 4,513,437 are hereby incorporated herein by reference.

The latest development in a signature verification methodology (U.S. Pat. No. 4,128,829) represents an improvement over past practices by applying correlation to pressure and to two orthogonal acceleration components.

The aforementioned signature verification methods have complicated logic structures to decide whether to accept or reject a sample signature. The origin of the problem is due to the inability of any one measure to distinguish reliably between verify and forgery signatures. For example, a former method uses three measures that we will call m1, m2 and m3. Let us assume that m1 is the best discriminator and m2 is second best. This method starts with a weak test on m3. Any signatures rejected by m3 would surely be rejected by m1 or m2 so this test only serves the function of saving computation time. m1 is then examined with three possible outcomes; (1) accept, (2) reject or (3) test m2. If test m2 is selected then M2 makes the final decision which is not desirable since m2 is not as good a discriminator as m1. Interchanging m1 with m2 in the above structure doesn't help because m2 passes on too many forgeries that m1 cannot distinguish. In addition, these methods do not allow one to easily trade increase (decreased) verify error rates for decreased (increased) forgery error rates. Such an ability would surely expand the possible applications for a signature verification system.

There is, therefore, a need for a signature verification method with a simple decision logic structure which is easily tunable to particular forgeability requirements. Further, there is a need for a verification method wherein one measure may dominate over another on an individual signature basis, depending upon how reliable such a measure is in distinguishing between forgeries and verifies (true signatures).

SUMMARY OF THE INVENTION

Accordingly, this invention provides a method of signature verification with a simple decision logic structure wherein the decision to accept or reject a sample signature is simplified to comparing a value known as the similarity measure to a threshold. If such threshold is exceeded, the signature is accepted as valid; otherwise, the signature is rejected as a forgery. The method equalizes all input measures by placing them all on a common scale, allowing any one input to dominate in the sense that it can drive the similarity measure over or under the threshold for accepting or rejecting the sample signature.

BRIEF DESCRIPTION OF THE DRAWINGS

FIG. 2A-2B shows respectively the x and y acceleration signals. FIG. 2C shows the rate of change of pressure signals.

DESCRIPTION OF THE PREFERRED EMBODIMENT

Figure 1:
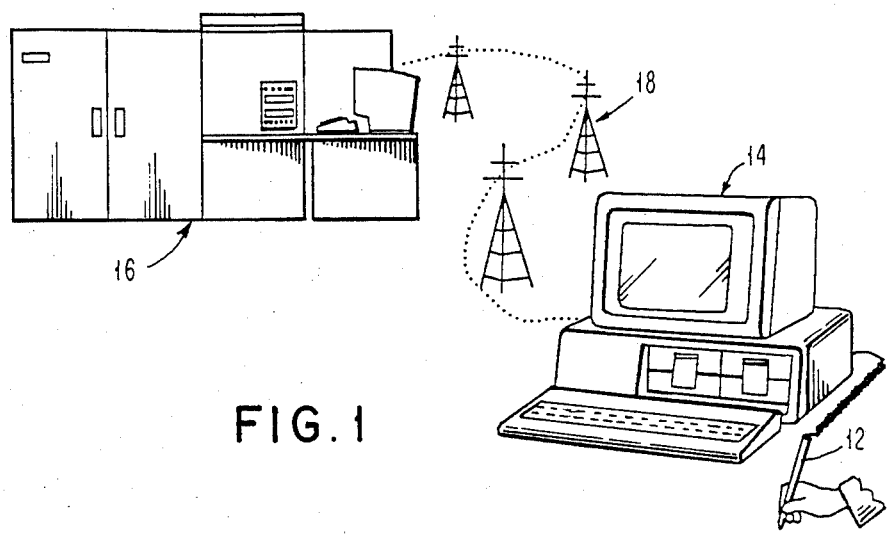
FIG. 1 is a schematic illustration of an overall system in which the method of this invention is used.

Shown in FIG. 1 is an overall apparatus used to execute the method of this invention. The pen 12 comprises sensors that measure the two components of acceleration perpendicular to the pen axis and the time derivative of the pressure applied to the pen tip. The axial pressure and acceleration components are produced on a pen as an individual signs his name. The preferred pen to use to implement the method of this invention is described in U.S. Pat. No. 4,513,437 which is incorporated herein by reference. The sensors are essentially bimorph piezoelectric transducers which produce electrical signals in response to rate of change of axial pressure on the pen and acceleration of the pen.

Figure 2A:
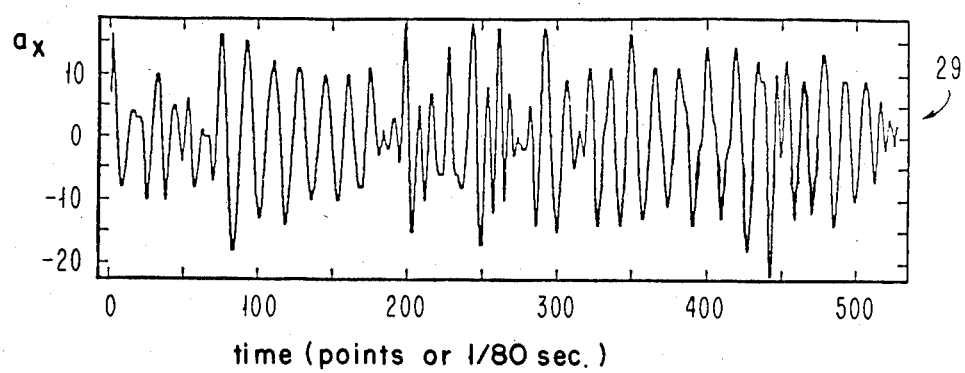
FIGS. 2A-2C are schematic illustrations of measurements of physical writing characteristics of a putative signer.
Figure 2B:
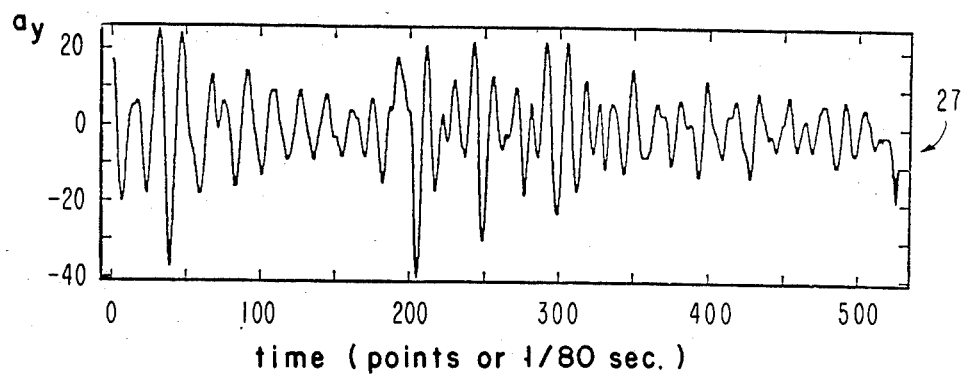
Figure 2C:
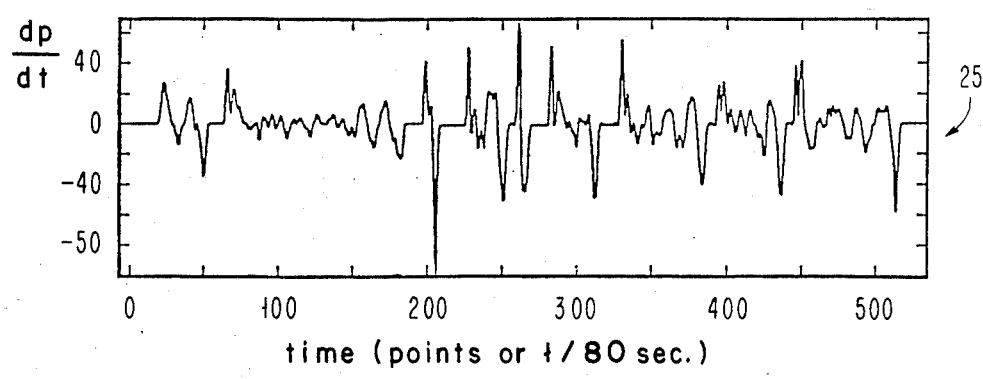

The data in FIG. 2 shows the acceleration of a pen (FIGS. 2A and 2B) and time derivative of the pressure on a pen (FIG. 2C) when a typical signer signs his name. The data are sampled at 80 Hz, the preferred sampling rate. Referring back to FIG. 1, the terminal 14 is used to acquire signatures and transmit signatures to the host computer. The host computer 16 performs the enrollment and verification of the signer or user. Also shown in FIG. 1 is the communications link 18 from the terminal to the host computer. A stand-alone personal computer can also be used to execute the method of this invention.

The analog signals from the pen must be amplified and then sampled to be in a form suitable for use by the method of this invention. The sampling must be done often enough and accurately enough to capture the information necessary to distinguish verifies from forgeries, however, over-sampling increases the cost of the system in terms of hardware, execution time and reference storage space. Studies of the spectrum of many signatures indicate that there is very little information above 20 Hz and that most of the information is in the range 2.5-12.5 Hz. A sampling rate of 80 Hz was chosen. The early work at IBM used a sampling rate of 100 Hz. This early work is described in an article by C. N. Liu, N. M. Herbst and N. J. Anthony, entitled "Automatic Signature Verification: System Description and Field Test Results", appearing in IEEE Trans. Sys. Man., Cybern., Vol. SMC-9, No. 1, pp. 35-38, 1979. This early work showed that the correlation scores degraded rapidly if the signals were sampled below 60 Hz. The correlation part of the algorithm requires locating the maximum value of the cross correlation of the two signature segments, an 80 Hz sampling rate introduces at most a 5% error in evaluating this maximum unless some form of data reconstruction or fractional shifting is employed. The 80 Hz rate is also conveniently far from 60 Hz, any 60 Hz noise that escapes the analog filters will alias to 20 Hz where it can be removed from the data without effecting the signal.

The data is sampled with an 8 bit analog to digital converter. The predominant noise source in the pen is from the vibrations of the pen rolling on the paper. The noise appears mostly on the accelerometers and is broad band extending to at least 1 khz. To adequately remove this noise with a sampling rate of 80 Hz would require a very sharp analog filter. Such a filter would also contribute large phase shifts to the signals in the frequency range of interest. Any large phase shift or change in phase shift either between channels of the accelerometer or between systems will degrade the input measures. In order to reduce the demands, and therefore the expense of the analog filter, the data is sampled at 640 Hz and a digital decimation filter is used to reduce the sampling frequency to 80 Hz. Since the Nyquist frequency is 320 Hertz, a filter with a more gradual roll off, and therefore a smaller phase shift in the signal bandwidth, can be used to prevent aliasing. The analog filter for the accelerometer is a 2 pole Butterworth filter with a $-3$ dB point at 30 Hz and a gain of 44 dB. One percent components are used throughout the filter and this is more than sufficient to provide interchangeability of the signature acquisition hardware.

The voltage follower amplifiers for the accelerometers have very large input resistors (50 Meg) and therefore significant output offset voltages due to the input offset current. An input blocking capacitor is necessary to remove this DC offset. This capacitor was selected to also remove the base line drift due to the pyroelectric effect when the signer first grabs the pen and the temperature of the accelerometers rises.

The pressure channel is subject to much larger forces and therefore produces much larger signals. The technique for detecting penlifts requires information about the baseline which requires DC coupling of the pressure amplifier. However, the larger signal amplitude and the larger capacitance and thus smaller input resistor on the pressure channel keep the DC offset in the pressure channel to an acceptable level.

The decimation filter averages the 16 previous samples every 1/80th of a second to calculate a data point. It has a linear phase shift so that its only effect is a time shift applied equally to all three signals. The A/D converter has two input ranges for each signal. The two ranges provide for increased sensitivity for light signers without clipping for heavy signers. The decision of which range to use is made by the acquisition software while acquiring the signature.

Software in the terminal, in our implementations and IBM PC, controls the signature acquisition and performs the decimation. The software uses the pressure channel data to determine the start and end of the signature. The maximum amount of data collected is 1000 points or 12.5 seconds. Approximately 1% of the users have signatures which exceed this limit. In those cases we simply stop taking data and use the first 1000 points in the algorithm. This does not seem to reduce the effectiveness of the method of this invention.

After the signature has been captured, the signals are further processed to improve the operation of the method of this invention. The pressure data is examined and the linear component of the baseline drift is removed. This drift is due to temperature changes that occur when the pen is first picked up. The accelerometers do not have this problem and only the average offset is removed. The high frequency components of the signals is further reduced by digital filtering after the segmentation has been determined.

A pair of signatures, each composed of a set of three waveforms as shown in FIG. 2, are directly compared and a score measuring their degree of similarity is calculated. Each pair of signatures comprises a sample signature and a reference signature which are compared. This approach differs fundamentally from those systems which attempt to characterize each signature with a set of measured characteristics and then compare the characteristics to measure the similarity.

The similarity measure is composed of five fundamental input measures of the signature pairs:
$M_1$—Segment Alignment
$M_2$—Pressure Correlation
$M_3$—Acceleration Correlation
$M_4$—Pressure Coherence, and
$M_5$—Acceleration Coherence.

Each of these measures has some ability to distinguish between verifies and forgeries and are combined in a way that maximizes the separation between verify and forgery similarity measure distributions. The computation of each of the input measures and the construction of the final similarity measure is described below. While this preferred embodiment employs only five basic input measures, using more or less input measures is also within the scope of this invention. A major point that deserves emphasis is that techniques that increase the similarity measure of two signatures do not necessarily improve the performance of the system. The bottom line in deciding whether a given technique improves the system is whether or not the overlap of the verify and forgery distributions is reduced. Absolute values on any scale for verify or forgery distributions when examined independently mean nothing.

Signatures are typically composed of several line segments, a segment being defined as the time the pen is in contact with the writing surface (pen-down followed by pen-up). Segments are fundamentally important to our comparison technique because the reproducibility of a signature is evident during pen-down periods, while pen-up periods show greater variability. The segments are also used in aligning the signature pieces in the other input measures of similarity since they provide timing marks which can be identified in each signature. The segment alignment measure, $M_1$, provides a value that indicates how well the segment lengths of the sample and reference compare.

Segments are determined by analyzing the signal that is the time derivative of the pressure on the pen tip. Representative pressure signals are shown in FIG. 2. The distinctive properties of a pen-lift (pen-up followed by pen-down) are evident; the long flat sections near zero surrounded by distinctive 'peaks' from the rapid change in pressure as the pen is lifted and then later set back down on the paper. This procedure is well known in the art and is described in U.S. Pat. No. 4,553,258 by Chainer et al and is incorporated herein by reference.

The similarity of the segment lengths of a signature pair is evaluated by $$M_1 = \frac{1}{NSEGS} \sum_{i=1}^{NSEGS} \frac{(seglr_i - segls_i)^2}{seglr_i \times segls_i}$$

where NSEGS is the total number of segments of the signature pair and $seglr_i$ and $segls_i$ are the lengths of corresponding segments in the reference and sample signatures, respectively, in units of number of points. $M_1$ is zero when the segment lengths are identical. Clearly, $M_1$ can only be evaluated when the signatures have the same number of segments. Unfortunately, a given sample will often not have the same number of segments as the reference. This is due to the natural variability of people and the imperfection of the segment detection algorithm. Therefore, any difference in the number of segments must be reconciled before the segmentation input measure is calculated. The signature with the fewer number of segments has artificial penlifts inserted where they appear to be missing with respect to the other signature. The algorithm for doing this is well known in the art and is described in T. J. Chainer, S. C. Gundersen and T. K. Worthington, IBM Technical Disclosure Bulletin, Vol. 27, No. 8, p. 4652 (1985). A check for reasonable alignment of the segments is then performed with the deletion of one segment in each signature if improved alignment can be obtained. The algorithm for this procedure is well known in the art and is described in T. J. Chainer, S. C. Gundersen and T. K. Worthington, IBM Technical Disclosure Bulletin, Vol. 27, No. 8, p. 4655 (1985).

Figure 3:
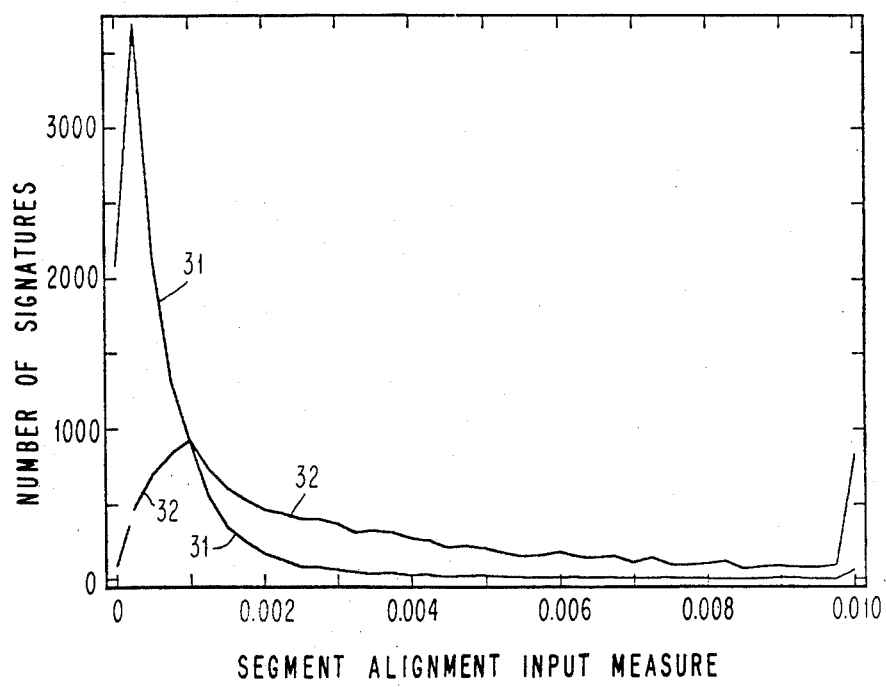
FIG. 3 is a schematic of normalized distributions of the segment alignment input measure.

The normalized distributions of the segment alignment input measure ($M_1$) verify (31) and forgery (32) signatures are shown in FIG. 3. The meaning of normalized is that the area under the curves has been equalized by scaling up the forgery data. The number of verify comparisons is 12271, and the pre-scaled number of forgery comparisons is 6271.

The final step in the segmentation process is to subdivide large paired segments. This technique is well known in the art and is described in T. J. Chainer, S. C. Gundersen and T. K. Worthington, IBM Technical Disclosure Bulletin, Vol. 27, No. 8, p. 4645 (1985). It has been observed that long segments tend to fall out of phase beyond the 0.7 second mark, even with very consistent signers. Better performance can be achieved by splitting these large segments into smaller pieces, the largest allowed piece being 55 points or 0.7 seconds. This length is actually user dependent, the value being set, during the enrollment process. The splitting, being performed on paired segments, also logs the initial location within the initial segments so that the penlift timing mark information is retained. Associated with each new sub-segment is a character array informing the remainder of the algorithm whether the segments should be left, middle or right aligned in carrying out the correlation and coherence portions of the algorithm.

Figure 4:
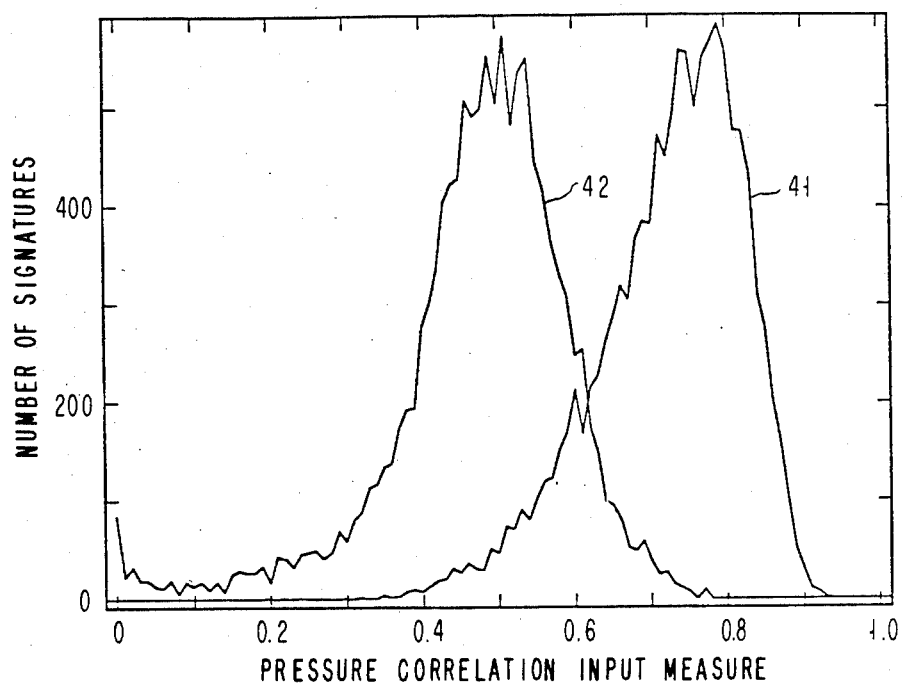
FIG. 4 is a schematic of normalized distributions of the pressure correlation input measure.

The regional correlation function is employed to obtain two input measures to the similarity measure. They are $M_2$, the pressure correlation input measure, and $M_3$, the acceleration correlation input measure. The method of obtaining these measures is described in U.S. Pat. No. 4,128,829, which is incorporated herein by reference. A method of obtaining acceleration components is also described in U.S. Pat. No. 3,983,535, which is herein incorporated by reference. These functions provide information on how alike two waveforms are in the time domain. The pressure regional correlation function operates on paired segments of the pressure waveforms of a sample and reference signature. The $i^{th}$ segments generate $$pscore_i = \mathrm{MAX}_\tau \left[ \frac{\sum_i S_p^i(t) R_p^i(t+\tau)}{\left[\sum_i S_p^i(t)^2\right]^{\frac{1}{2}} \left[\sum_i R_p^i(t)^2\right]^{\frac{1}{2}}} \right]$$

where $S_p^i(k)$ is the $i^{th}$ segment pressure signal of the sample signature and $R_p^i(k)$ is the $i^{th}$ segment pressure signal of the reference signature, and where $pscore_i$ is the maximum value found over the allowed time lags $\tau$. The time lags used are dependent upon the initial alignment position that depends on the origin of the segments. If the left or right portion of the segments correspond to a true penlift, the segments are left or right aligned respectively. Segments that have been artificially created by splitting large segments might have their origin within the body of the original segment and are aligned about their relative centers. The maximum shift, or time lag, for the pressure correlation is a fixed percentage, SHIFT, of the total time of the longer segment. The value of SHIFT is user dependent and set during reference generation as described below. The allowable range is 12.27%-15.00%. $M_2$ is then computed as a weighted sum by $$M_2 = \sum_{i=1}^{NSEGS} olapp_i \times pscore_i$$

where the weight factor, $olapp_i$, is the amount of time the two segments overlap divided by the total pendown time of the reference signature. The weighting factor effectively reduces the contribution of segments that require large shifts. The segmentation is more consistent for verifies than forgeries and therefore large shifts are less likely for verify signatures. The overlap factor can then be viewed as a means for enhancing the distinguishability of the regional correlation function. This is an example of a case where the absolute value of an input measure is reduced in favor of separating the verify and forgery distributions. The normalized distributions for the pressure correlation input measure is shown in FIG. 4. The normalized distribution of the pressure correlation measure ($M_2$) for verifying signatures is shown by 41 while that for forgeries is shown by 42.

The regional acceleration correlation function is computed in a way that is independent of rotations about the pen axis. This is accomplished by combining the x and y acceleration signals of the reference and sample signatures into the complex pairs $$R_a(t) = R_x(t) + iR_y(t)$$

$$S_a(t) = S_x(t) + iS_y(t)$$

Figure 5:
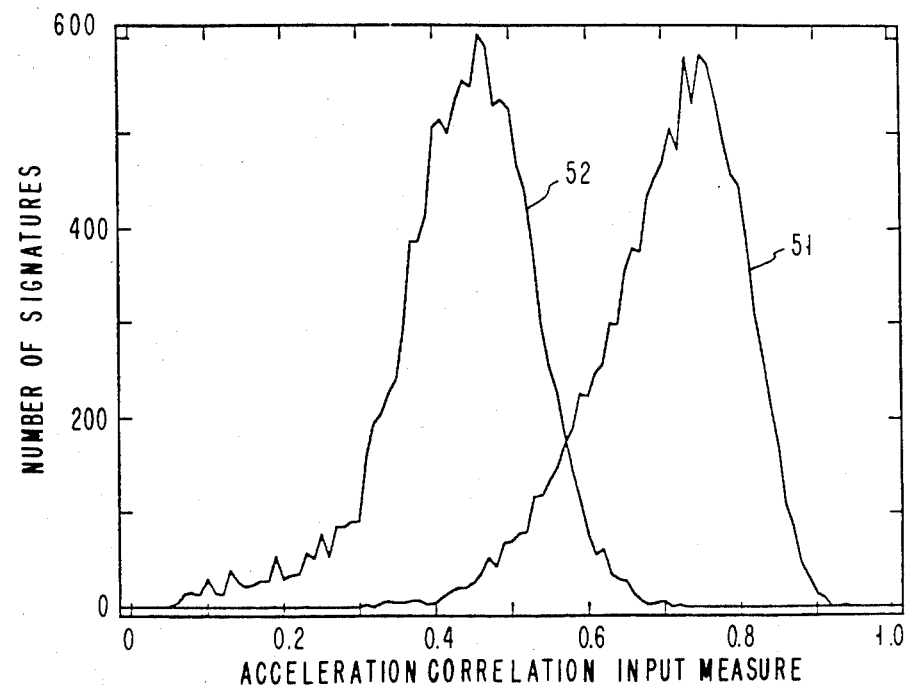
FIG. 5 is a schematic of normalized distributions of the acceleration correlation input measure.

The regional acceleration function can then be expressed as $$ascore_i = \mathrm{MAX}_\tau \left[ \frac{\left|\sum_i S_a^i(t) R_a^i(t+\tau)\right|}{\left[\sum_i |S_a^i(t)|^2\right]^{\frac{1}{2}} \left[\sum_i |R_a^i(t)|^2\right]^{\frac{1}{2}}} \right]$$

where | | symbols indicate the magnitude of the complex quantities. Rotations about the pen axis produce a phase factor that is eliminated by using the magnitude of the sum of complex correlation for each segment. The amount of shifting for the acceleration correlation function is limited to +/−1 point from the final alignment found in evaluating the pressure correlation function since the acceleration signals are 'phase-locked' to the pressure signal. This method is described in U.S. Pat. No. 4,553,259, issued 11/12/85, and U.S. Pat. No. 4,562,592 issued 12/31/85 and are incorporated by reference. The acceleration correlation similarity component, $M_3$, is then found by $$M_3 = \sum_{i=1}^{NSEGS} olapa_i \times ascore_i$$

where $olapa_i$ is the amount of time the reference and sample acceleration segments overlap divided by the total pen-down time of the reference signature. The normalized distributions for the acceleration correlation input measure are shown in FIG. 5.

The normalized distribution of the acceleration correlation measure ($M_3$) for verifies is shown by 51 while that for forgeries is shown by 52.

The magnitude squared coherence function, $\gamma^2(f)$, hereafter referred to as just the coherence function, is used by the signature verification algorithm to obtain two input measures to the similarity measure. The coherence function provides information about the similarity of the reference and sample signals in the frequency domain. The definition of the coherence function is given by $$\gamma^2(f) = \frac{|G_{rs}(f)|^2}{|G_{rr}(f)||G_{ss}(f)|}$$

where f is the frequency, $G_{rs}(f)$ is the cross spectral density function between the reference and sample signals, and $G_{rr}(f)$ and $G_{ss}(f)$ are auto spectral densities of the reference and sample signals respectively. $\gamma^2(f)$ provides information on the relative power contained in the signals at frequency f.

The conventional use of the coherence function is as a comparison between an input and output signal of a linear two-port system. A value of one indicates that the frequency content of the two signals at frequency f is identical. A value less than one indicates that the output signal has contributions due to random noise and/or system nonlinearities. In our system we interpret the reference as the input signal, the sample as the output signal and the system as the user variability plus any noise sources inherent in the hardware.

To obtain meaningful results from the coherence function it is necessary to construct pseudo-signatures from the input waveforms. This reconstruction serves three purposes:

(1) To time align each pair of segments in the reference and sample, by using the time lag that maximized the regional correlation function.

(2) To force each segment into an N-point segment of the pseudo-signature by truncation or padding with zeros. Choosing a power of 2 for N prepares the signals for conversion to the frequency domain by the use of an efficient fast Fourier transform algorithm.

(3) To taper the pseudo-signature's segments to eliminate artificial high frequency Fourier components introduced by truncation of the waveforms.

Figure 6A:
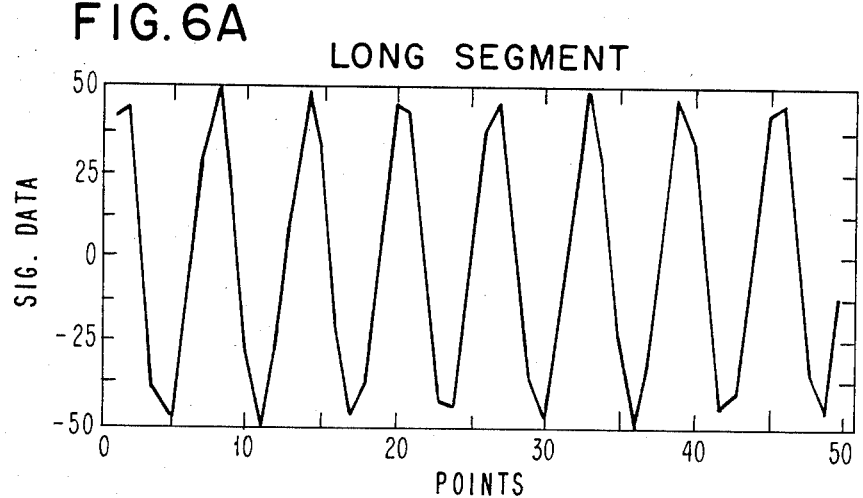
FIGS. 6A-6F are schematic illustrations of pseudo-signature segments which have been tapered, truncated and padded.
Figure 6C:
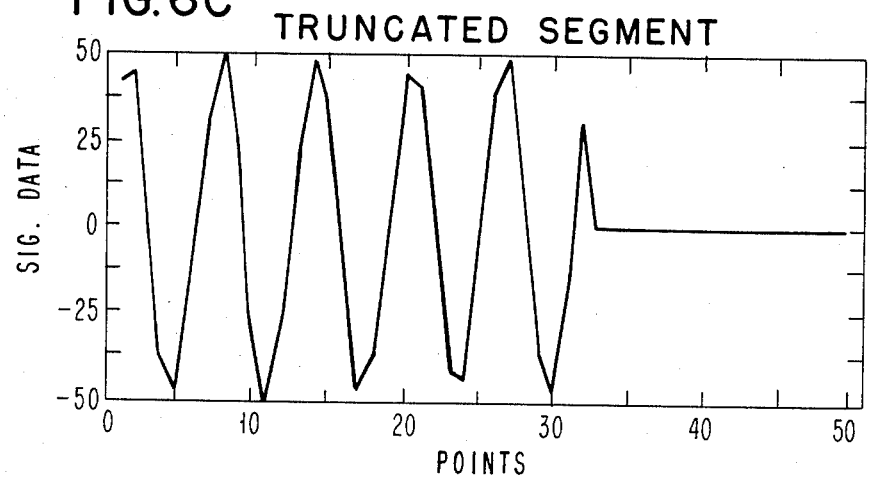
Figure 6E:
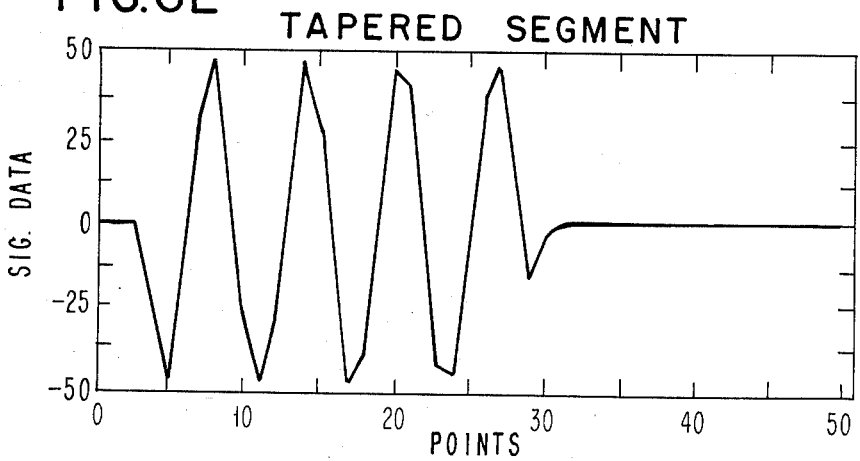
Figure 6B:
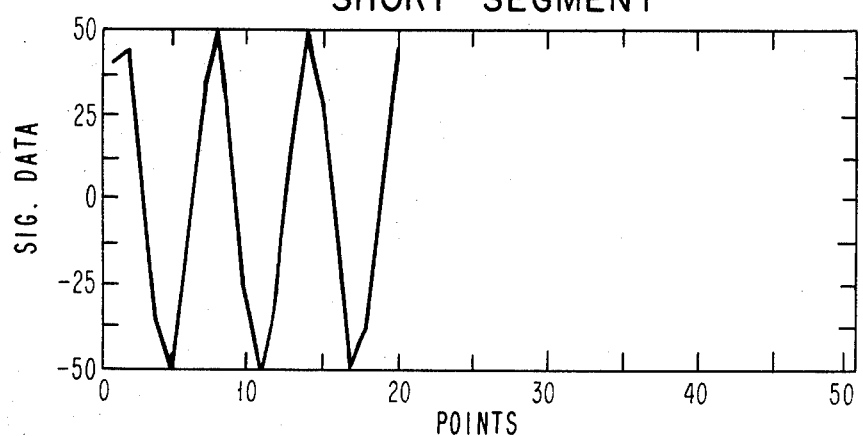
Figure 6D:
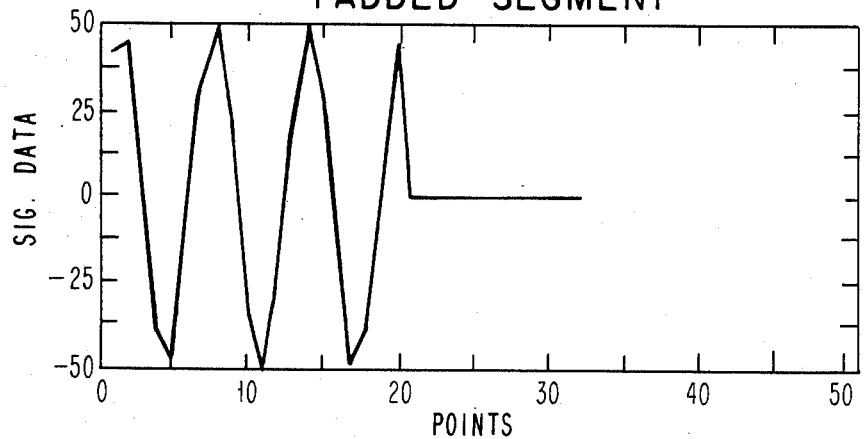
Figure 6F:
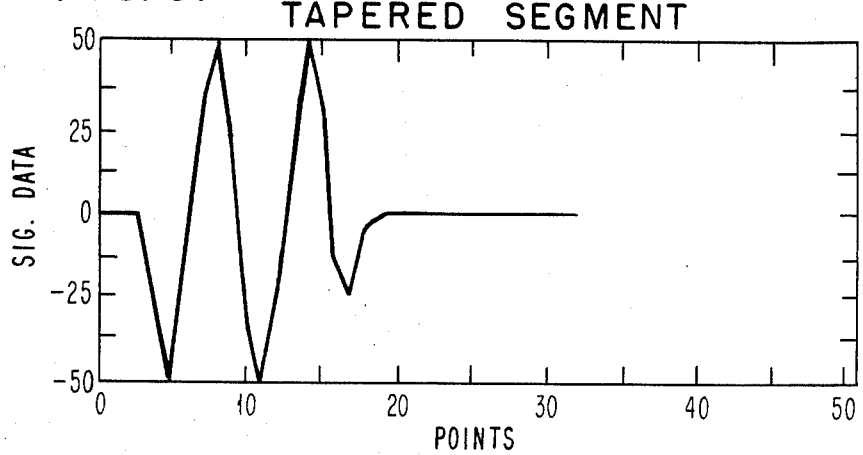

Referring to FIGS. 6A–6F, if the segment is longer than 32 point, see FIG. 6A, the signals are truncated as shown in FIG. 6C. Truncating means that the signal, beyond the 32nd point of a segment, is simply ignored for that segment or the segment is artificially cut short, so that a 32 point segment can be obtained. If the actual segment is shorter than 32 points, see FIG. 6B, then the signal is padded with zeros up to 32 points, as shown in FIG. 6D. Thus, with padding, there is a full artificially created 32 point segment with zeros assigned to each point beyond the points in the actual segment. The signals in FIGS. 6C and 6D are also tapered as shown in FIGS. 6E and 6F respectively, to reduce high frequency components. The tapering of the ends of these pseudo-signature segments referred to above is accomplished by multiplying each segment with the windowing function $$w(i) = \begin{cases} 0.0200000 & i = 1, \min(32, NPTS) \\ 0.0263157 & i = 2, \min(31, NPTS) \\ 0.0714285 & i = 3, \min(30, NPTS) \\ 0.5000000 & i = 4, \min(29, NPTS) \\ 1.0000000 & \text{otherwise} \end{cases}$$

where NPTS is the number of true points in the segment and min(N,NPTS) means the minimum of N and NPTS.

The choice of 32 point segments provides an adequate number of segments for establishing reliable spectral estimates with minimal data loss at the end of some segments. The spectral densities are computed by the Welch method of time averaging the N-point segments of the pseudo-signature. This method is well known to those of average skill in the art and is described in an article by P. D. Welch, entitled, "The use of the Fast Fourier Transform for the Estimation of Power Spectra", IEEE Trans Audio Electroacoustics, Vol. Au-15, June 1970, pp. 70–73. A 32 point fast Fourier transform is used to provide a frequency resolution of 2.5 Hz from zero to the Nyquist cutoff of 40 Hz. The cross power spectral density is given by $$G_{rs}(f) = \frac{1}{NSEGS} \sum_{i=1}^{NSEGS} g_{rs}^i(f)$$

where Nsegs is the total number of segment pairs in the reference and sample pseudo-signatures and $g_{rs}(f)$ is the contribution from segment pair i and is given by $$g_{rs}^i(f) = S_f^{i*}(f) \times R_f^i(f)$$

where $S_f^i(f)$ and $R_f^i(i)$ are the Fourier coefficients of the sample and reference pseudo-signature's segment.

$$R_f^i(f) = \sum_{n=0}^{N-1} R_p^i(t)e^{-in2\pi ft}$$

$$S_f^i(f) = \sum_{n=0}^{N-1} S_p^i(t)e^{-bi2\pi ft}$$

Figure 7:
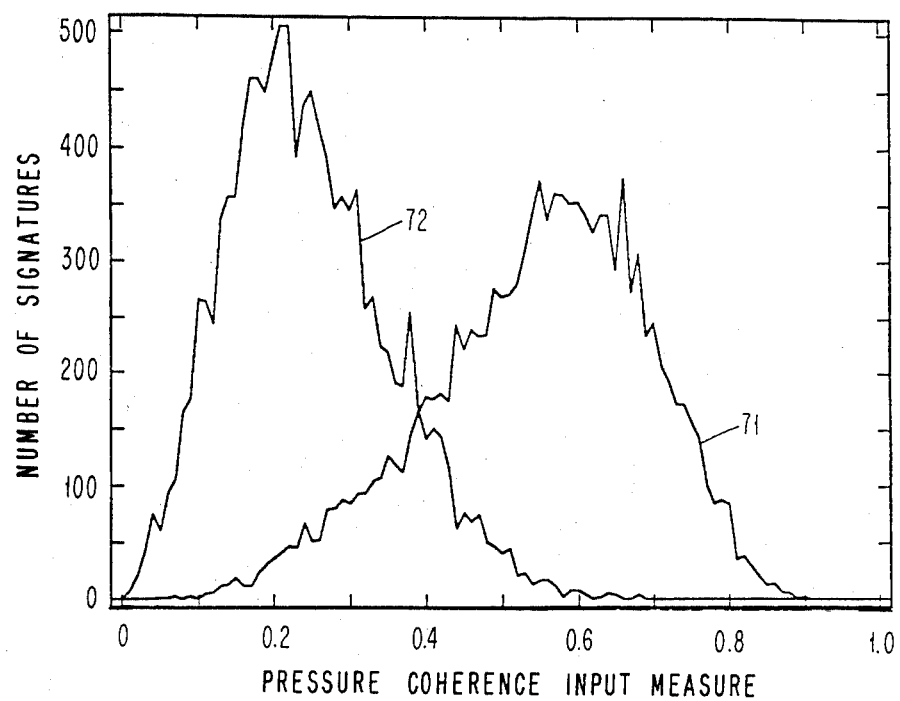
FIG. 7 is a schematic of normalized distributions of the pressure coherence input measure.

The pressure coherence measure obtained from the coherence function is computed by the weighted sum $$M_4 = \sum_{n=1}^{5} w_p(nf_o)\gamma_p^2(nf_o)$$

where $f_o$ is 2.5 Hz. The weighting factors are $w_p(2.5) = 0.2498$ $w_p(5.0) = 0.2481$ $w_p(7.5) = 0.1937$ $w_p(10.0) = 0.1588$ $w_p(12.5) = 0.1497$ and have been selected to maximize the separation of the verify and forgery pressure coherence distributions. The normalized distributions for the pressure coherence input measure are shown in FIG. 7. The distribution of the pressure coherence measure ($M_4$) for verify signatures is shown by 71 while that for forgeries is shown by 72.

The acceleration signals are treated in an analogous way to the pressure signals except for use of the complex acceleration signals in equation 1 which supplies the required rotational invariance to the coherence function. The acceleration coherence input measure is then computed by the weighted sum $$M_5 = \sum_{n=2}^{5} w_a(nf_o)\gamma_a^2(nf_o)$$

where, in this case, the sum covers the frequency range from 5-12.5 Hz. The acceleration weighting factors are:

$w_a(5.0) = 0.3126$ $w_a(7.5) = 0.2780$ $w_a(10.0) = 0.2075$ $w_a(12.5) = 0.1999$

Figure 8:
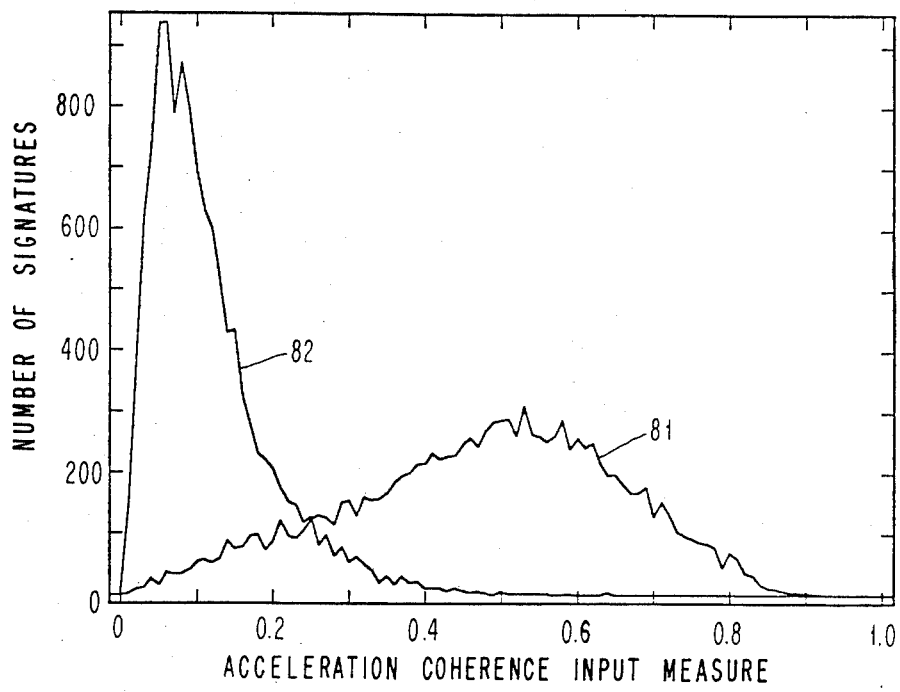
FIG. 8 is a schematic illustration of normalized distributions of the acceleration coherence input measure.

The normalized distributions are shown in FIG. 8. The distribution of the acceleration coherence measure ($M_5$) for verify signatures is shown by 81 while that for forgeries is shown by 82.

The choice of a 2.5 Hz frequency resolution has been shown to be an optimum choice under the constraints of using an 80 Hz sampling rate for the signature data and requiring segments of length equal to a power of 2 for computational efficiency. This equates to using 32 point segments for the pseudo-signature. The choice of 16 point segments provides too coarse a frequency resolution of 5 Hz giving only 3 measures in the 2.5-15 Hz range of interest. The choice of 64 point segments, while providing a finer resolution of 1.25 Hz reduces the number of segments in the pseudo-signature by a factor of 2 thereby reducing the accuracy of the spectral densities. Experiments with this choice have shown that the optimum performance is obtained with the selection of 32 point segments.

The similarity measure uses a set of parameters that depend upon the normalized distributions of the input measures for a general population of users. The tests performed have provided roughly 28,000 signatures to use as a sample population for parameter selection. The basic characteristics of the input measures are clearly illustrated by the normalized distributions of the input measures (see FIGS. 3-5 and 7-8). Each plot can be divided into three regions that can be characterized by the probabilities that the sample is a true verify or a forgery. These regions are:

I—to the left of the verify distribution where the probability for a forgery is high.

II—between the peaks of the two distributions where the two distributions overlap and neither probability is high.

III—to the right of the forgery distribution where the probability for a verify is high.

(The interchange of left $\theta \rightarrow$ right is necessary for the segmentation alignment distribution since in this case small values represent good alignment.)

The similarity measure is designed to combine these probabilities in a fashion that weights more strongly the input measures that obtain values in the more probabilistically certain regions of the distributions. This provides a mechanism that emphasizes the most reproducible input measures for verifiers and requires forgers to perform reasonably well on all input measures in order to be accepted. Each raw input measure is converted to a component, $Sm_i$, of the similarity measure. The preliminary total similarity measure is determined by summing the components $$SM = \sum_i Sm_i \qquad [2]$$

Figure 9:
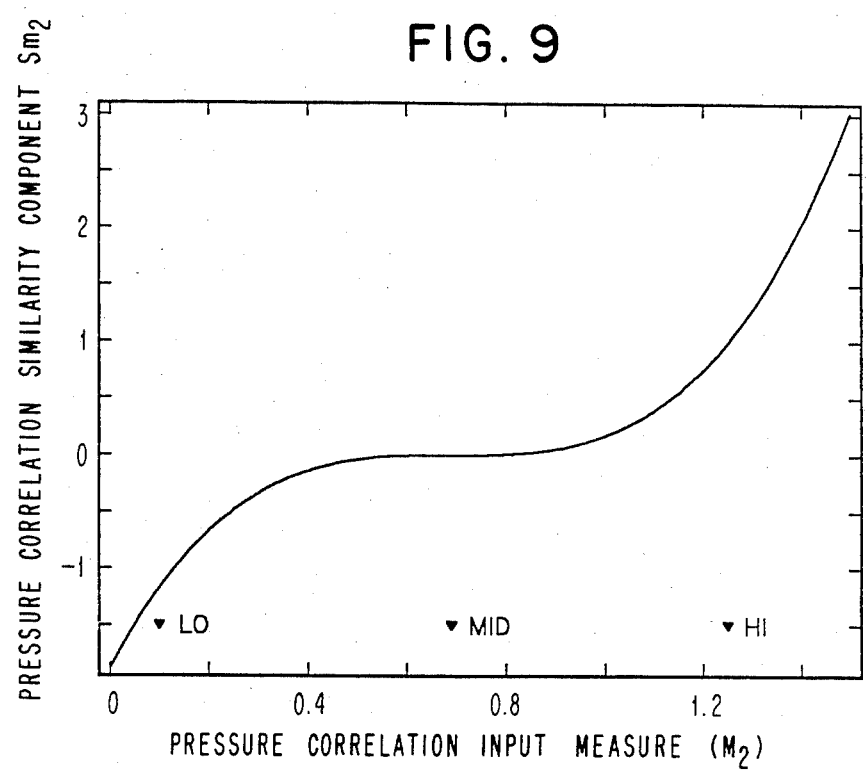
FIG. 9 is a schematic illustration of the pressure correlation similarity component plotted against the pressure correlation input measure.

The calculation of the similarity components will now be described using the pressure correlation input measure as a representative example. A function that represents the probabilistic behavior in the three regions discussed above is shown in FIG. 9. Increasing negative values represent pressure correlation input measures in region I of high forgery probability. Increasing positive values represent high verify probability. And the region near zero value for the similarity component represents the region of overlap of the verify and forgery distributions. The three markers, LO, MID, and HI included in the plot are the set of parameters used in calculating the similarity component. The function is expressed by $$Sm_i = \text{SIGN}(M_i - MID_i) \left| \frac{(M_i - MID_i)}{(HI_i - MID_i)} \right|^m \quad M_i > MID_i \qquad [3a]$$

$$Sm_i = \text{SIGN}(M_i - MID_i) \left| \frac{M_i - MID_i}{MID_i - LO_i} \right|^m \quad M_i < MID_i \qquad [3b]$$

The values of $MID_i$, $LO_i$ and $HI_i$ are chosen as the point at which 99.9% of the forgeries have a component value less than 0.02 and 98.0% of the verifies have a component value greater than −0.02. A starting value for $MID_i$ was the crossover point of the normalized verify and forgery distributions from the sample population. $LO_i$ and $HI_i$ were initialized to points in the tails of the verify distribution in region I and the forgery distribution in region III respectively. These starting values were then adjusted until the similarity component values had 99.9% of the forgery attempts less than 0.02 and 98.0% of the verify attempts greater than −0.02. Other values of m may be used but m=3 is preferred. The values for the similarity parameters before individualization are:

0.100 —pressure correlation LO standard
0.690 —pressure correlation MID standard
1.250 —pressure correlation HI standard
0.320 —acceleration correlation LO standard
0.660 —acceleration correlation MID standard
1.700 —acceleration correlation HI standard
−0.120 —pressure coherence LO standard
0.440 —pressure coherence MID standard
2.900 —pressure coherence HI standard
−0.200 —acceleration coherence LO standard
0.320 —acceleration coherence MID standard
2.200 —acceleration coherence HI standard
−0.0300 —segment alignment LO standard
−0.00235 —segment alignment MID standard
−0.0150 —segment alignment HI standard The above parameters are referred to as the standard similarity parameters.

Figure 10:
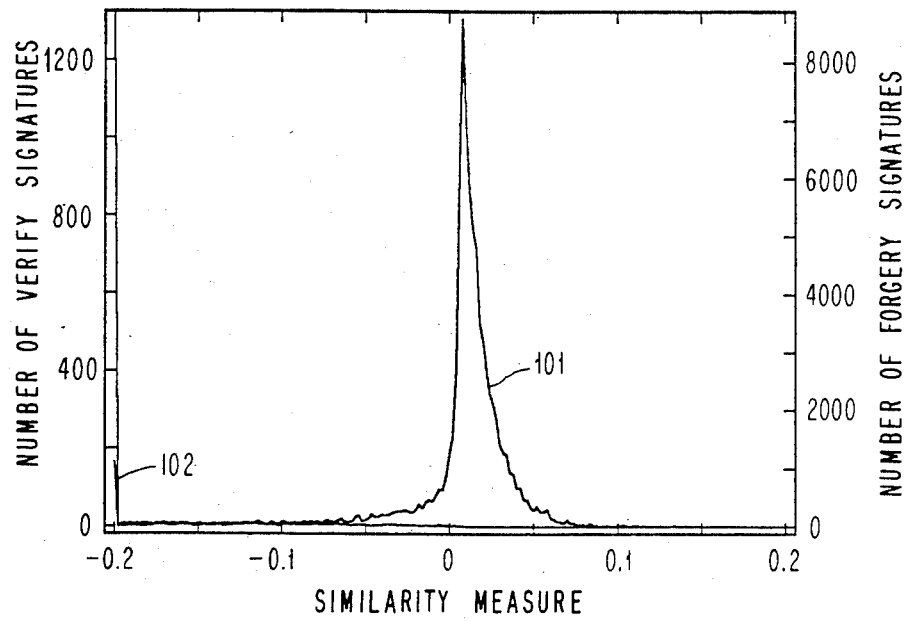
FIG. 10. is a schematic illustration of normalized distribution of the similarity measure.

Note the range of the similarity component is not zero to one, so it is not a true probability measure, but reflects the probabilities discussed above. (Also note that the segment alignment input measure M1 is multiplied by −1 before inserting into the above equation). The input measures are converted to a common scale by equations 3a and 3b, that is independent of the range of values of the input measure and allows the inputs to be combined by equation 2. A natural weighting of the input measures has been accomplished by this technique, since the choice of the parameters, $LO_i$, $MID_i$ and $HI_i$, is dependent upon the separation of the distributions and therefore the range of each similarity component reflects that separation. Note that, by design, the domain of the similarity component curve exceeds the range of the input measure. The parameters are also fine tuned for each individual during reference generation. The normalized distribution for the similarity measures is shown in FIG. 10, with the distributions for verify signatures (101) on the right and forgeries (102) on the left.

The reference file contains the set of control parameters used by the similarity algorithm and two signatures with which the sample signature can be compared. The purpose of the reference generation algorithm is to establish the control parameters and to select which signatures will serve as reference 1 and reference 2.

The purpose of individualizing the control parameters is to recognize the difference in the degree of variability between users. More consistent signers have control parameters assigned that reduce the value of their similarity components to an extent that reduces the probability of a type II error occurring against their reference. These parameters include:

The maximum segment length, MAXPTS.

The shift percentage, SHIFT, for the regional pressure correlation function.

The five sets of similarity component parameters, $LO_i$, $MID_i$ and $HI_i$.

An overall adjustment parameter to the similarity measure, REF.

All of these parameters were selected by analyzing the results of simulation studies using performance measures as a guideline.

The structure of the signature verification system makes use of two specially classified signatures termed reference 1 and reference 2 selected from a set of N, where N is any number greater than 2.

The algorithm is envoked twice for each user. First at the initial enrollment when 6 signatures are collected. This set of signatures tends to be artificially consistent due to the user supplying them in rapid succession. To obtain a more realistic sample of signatures from the user, the next 6 signatures obtained during verify sessions are combined with the initial 6 and supplied to the reference generation algorithm. This algorithm is well known in the art and is described in T. J. Chainer, S. C. Gundersen and T. K. Worthington, IBM Technical Disclosure Bulletin, Vol. 27, No. 7A, p. 4033 (1984). The algorithm starts with an initial value of 45 for the maximum segment length (MAXPTS) parameter and a shift percentage (SHIFT) of 15%. This algorithm is well known in the art and is described by T. J. Chainer, S. C. Gundersen and T. K. Worthington in the IBM Technical Disclosure Bulletin, Vol. 27, No. 7B, p. 4582 (1984). A combined correlation measure $$COR = \frac{M2 + 2*M3}{3}$$

is calculated for each pair of signatures in the set and the average, AVGCOR, is calculated. AVGCOR is then used to set MAXPTS and SHIFT for this user by $$MAXPTS = 250 * (AVGCOR - 0.60)^2 + 45$$

$$SHIFT = \frac{6.75}{100 * MAXPTS}$$

An upper cutoff of 55 is applied to MAXPTS and this limits the range of SHIFT to 12.27-15%. These individualized parameters are then used to create an N×N combined coherence input measure matrix $$X^{ij} = \frac{(M_4^{ij} + 2 \times M_5^{ij})}{3}$$

where $M_4^{ij}$ ($M_5^{ij}$) is the pressure (acceleration) coherence input measure determined from comparing signature i with signature j. This matrix is then used to select the two references from the set of N signatures. The method used is a slight modification of the technique developed by Herbst and Liu. The technique is as follows:

1. For every combination of selecting a pair of signatures from the set of N, determine the maximum of the two input measures versus each signature in the set. (In matrix terms, isolate the two rows that correspond to the pair of signatures selected. For each column in these two rows, select the maximum of the two input measures.)

2. Save the minimum of these maximum values for each pair.

3. Select the pair that produces the maximum of the saved minimum values.

This technique allows nicely for sets of enroll signatures that contain two distinct classes of signatures since references are selected in pairs. A problem can arise if the set of N signatures contains one maverick signature, possibly an unintentional error caused by dropping the pen or some other such mishap. The technique will select the maverick as one of the references. This case is tested for by demanding that each member of the pair contributes at least two of the maximum values. If a maverick is identified by this criteria, it is removed from the set and the procedure is then re-executed with the reduced set of signatures. A second combined correlation matrix, whose components are $$Y^{ij} = \frac{(M_2^{ij} + 2 \times M_3^{ij})}{3}$$

is also utilized in testing for mavericks. The coherence matrix, $X^{ij}$ is used to select the pair of signatures by the technique described above and then used to test for the occurrence of a maverick. If a maverick is discovered it is eliminated and a new pair is selected from the reduced set. The correlation matrix is then used to test for a correlation maverick and if one is detected then a new pair is once again selected from the possibly further reduced set.

The set of similarity component parameters are individualized during the reference generation procedure.

An average value for input measure M2, M3, M4 and M5 are calculated from the set of N signatures. These averages are then compared to an expected average for the general population of users to determine whether and by how much to adjust the similarity component parameters.

Let SCORE represent the average of an input measure for the N enrollment signatures and CUT the expected average for this measure. The adjustment similarity component parameters for this measure is then determined by

ADJUST = SCORE − CUT.

The ADJUST parameter is then limited to a range defined by two fixed parameters, uplim—the upper limit, and lolim—the lower limit. The similarity component parameters are then modified by LO = LOstandard + ADJUST
MID = MIDstandard + ADJUST
HI = HIstandard + ADJUST The expected averages, the cut values, that are used are corpcut = 0.711 expected pressure correlation average
coracut = 0.730 expected acceleration correlation average
cohpcut = 0.536 expected pressure coherence average and upper and lower limiting parameters used are corpup = 0.01 pressure correlation upper limit
corplo = 0.10 pressure correlation lower limit
coraup = 0.05 acceleration correlation upper limit
coralo = −0.16 acceleration correlation lower limit
cohpup = 0.00 pressure coherence upper limit
cohplo = 0.04 pressure coherence lower limit
cohaup = 0.00 acceleration coherence upper limit
cohalo = 0.02 acceleration coherence lower limit Note that the segment alignment similarity component parameters are not individualized. The final individualized parameter determined during enrollment is the overall adjustment to the similarity measure REF, [T. J. Chainer, S. C. Gundersen and T. K. Worthington, IBM Technical Disclosure Bulletin, Vol. 27, No. 7B, p. 4582 (1984)]. This is determined by computing the preliminary similarity measure, Smp, using the average measures with the standard similarity component parameters and calculating $$REF = Smp \times sensitivity - expected$$

then limiting the range of REF to −0.006 and 0.003. The values of the parameters sensitivity is 0.588 and the parameter expected is 0.0053. The final similarity measure calculated for a user during a verify session is determined by calculating the preliminary similarity measure Smp using the individual parameters and making the final adjustment $$Sm = Smp - REF.$$

The effect is to make it more difficult for consistent signers to be forged while aiding less consistent signers. The normalized distributions of the similarity measure are shown in FIG. 10. Notice that the separation between the verify and forgery distribution is greatly increased over that observed for the individual input measures.

Figure 11:
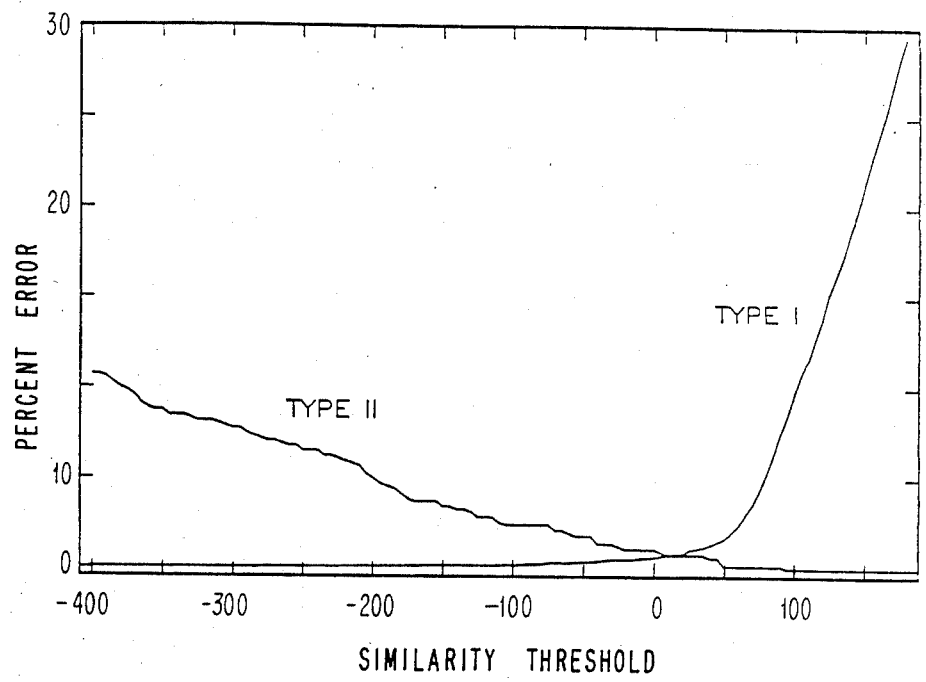
FIG. 11 is a plot of the Type I and Type II error rates as a function of threshold obtained from the use of the similarity measure.

The decision process for the signature verification system is reduced to comparing the similarity measure with a threshold value and accepting the signature as true if the threshold is exceeded. If it is not exceeded when compared to the first reference, a comparison is done with the second reference. A summary of the traditional performance measures of a personal identification system is shown in FIG. 11 for three signature sessions. (Note the scale for the similarity measure is multiplied by a factor of 10000.) The crossover of the two verify and forgery curves occurs at a threshold value of 0.001 where the Type I and Type II session error rates are 0.8%.

Having thus described my invention, what I claim as new and desire to secure by Letters Patent is:

1. A machine method of verifying a signature of a putative signer, comprising the steps of:
   (a) measuring a set of physical writing characteristics of the putative signer when the putative signer writes his signature;
   (b) determining input measures ($M_2, M_2, \ldots$) for the signature of the from the measurements of the physical writing characteristics in step (a);
   (c) determining similarity components ($Sm_2, Sm_2, \ldots$) from the input measure obtained in step (b), each similarity component being defined by the relationship $$Sm_i = \text{SIGN}(M_i - MIDi) \left| \frac{(M_i - MIDi)}{(HI_i - MIDi)} \right|^m \quad M_i > MIDi$$

$$Sm_i = \text{SIGN}(M_i - MIDi) \left| \frac{M_i - MIDi}{MID_i - LO_i} \right|^m \quad M_i < MIDi$$

where MIDi is approximately the value of the i-th measure at the intersection of the normalized distributions for the i-th measure for verifies and forgeries, where HIi is chosen as a value at which a relatively large preselected percentage of forgeries have a similarity component of less than a preselected maximum, where LOi is chosen as a value at which a relatively large preselected percentage of verifies have a similarity component value greater than a preselected minimum, and where m is a preselected number $\geq 1$;

(d) determining a preliminary similarity measure from the similarity components of step (c), the preliminary similarity measure being defined as the sum of the similarity components;
   (e) comparing the preliminary similarity measure with a preselected threshold to verify the signature.

2. A machine method as recited in claim 1 wherein the step of measuring the set of physical writing characteristic comprises the step of measuring electrical signals produced by a pen when the signature is written with the pen.

3. A machine method as recited in claim 2, wherein the electrical signals produced by the pen comprise three sample signals, the first sample signal being proportional to the x-acceleration, the second sample signal being proportional to the y-acceleration and finally the third signal being proportional to rate of change of axial pen pressure, all three sample signals being produced by the writing of the signature by the putative signer.

4. A machine method as recited in claim 2, wherein the input measures determined comprise the following input measures: segment alignment, pressure correlation, acceleration correlation, pressure coherence, and acceleration of coherence.

5. A machine method as recited in claim 1, wherein the physical writing characteristics comprise the characteristics of the rate of change of pen pressure and pen acceleration.

6. A machine method as recited in claim 5, wherein the rate of change of pen pressure is measured in the axial direction of the pen and the acceleration, the acceleration being measured in two approximately orthogonal directions in a plane perpendicular to the pen axis.

7. A machine method of verifying a signature of a putative signer, comprising the steps of:

(a) measuring a set of physical writing characteristics of the putative signer when the putative signer writes his signature;

(b) determining input measures ($M_1, M_2, \ldots$) for the signature of the putative signer from the measurements of the physical writing characteristics in step (a);

(c) determining similarity components ($Sm_1, SM_2, \ldots$) from the input measures obtained in step (b), each similarity component being defined by the relationship $$Sm_i = \text{SIGN}(M_i - MIDi) \left| \frac{(M_i - MIDi)}{(HI_i - MIDi)} \right|^m \quad M_i > MIDi$$

$$Sm_i = \text{SIGN}(M_i - MIDi) \left| \frac{M_i - MIDi}{MID_i - LO_i} \right|^m \quad M_i < MIDi$$

where MIDi is approximately the value of the i-th measure at the intersection of the normalized distributions for the i-th measure for verifies and forgeries, where HIi is chosen as a value at which a relatively large preselected percentage of forgeries have a similarity component of less than a preselected maximum, where LOi is chosen as a value at which a relatively large preselected percentage of verifies have a similarity component value greater than a preselected minimum, and where m is a preselected number $\geq 3$;

(d) determining a preliminary similarity measure (Smp) from the similarity components of step (c), the preliminary similarity measure being defined as the sum of the similarity components;

(e) determining a similarity measure from the preliminary similarity measure, the similarity measure (SM) being defined as $SM = Smp - REF$ where REF is an individualized small adjustment parameter determined during enrollment by $REF = \overline{Smp} \times SENSITIVITY - EXPECTED$ where the bar over Smp indicates that average input measures for a set of enrollment signatures and standard similarity parameters are used to determine the preliminary similarity measure, sensitivity approximately = 0.588 and expected approximately = 0.0053;

(f) comparing the similarity measure with a preselected threshold to verify the signature.

8. A machine method as recited in claim 7, wherein the step of measuring the set of physical writing characteristic comprises the step of measuring electrical signals produced by a pen when the signature is written with the pen.

9. A machine method as recited in claim 8, wherein the electrical signals produced by the pen comprise three sample signals, the first sample signal being proportional to the x-acceleration, the second sample signal being proportional to the y-acceleration and finally the third signal being proportional to rate of change of axial pen pressure, all three sample signals being produced by the writing of the signature by the putative signer.

10. A machine method as recited in claim 8, wherein the input measures determined comprise the following input measures: segment alignment, pressure correlation, acceleration correlation, pressure coherence, and acceleration of coherence.

11. A machine method as recited in claim 7, wherein the physical writing characteristics comprise the characteristics of the rate of change of pen pressure and pen acceleration.

12. A machine method as recited in claim 11, wherein the rate of change of pen pressure is measured in the axial direction of the pen and wherein, the acceleration is measured in two approximately orthogonal directions in a plane perpendicular to the pen axis.

13. A machine method as recited in claim 7, wherein there is at least two input measures.

14. A machine method as recited in claim 7, wherein the input measures determined are the five input measures in claim 13.

15. A machine method as recited in claim 7, wherein the integer m equals 3.

16. A machine method of verifying a signature of a putative signer, comprising the steps of:

(a) measuring the rate of change of axial pen pressure and two approximately orthogonal components of pen acceleration, the acceleration components being in a plane orthogonal to the axis of the pen, the acceleration components and the rate of change pressure being produced on a pen by the writing of the signature by the putative signer with the pen of the writing surface;

(b) determining input measures ($M_1, M_2, \ldots$) from the rate of change of axial pen pressure and the two approximately orthogonal acceleration components, the input measures comprising: a segment alignment input measure, a pressure correlation input measure, an acceleration correlation input measure, a pressure coherence input measure and an acceleration coherence input measure;

(c) determining similarity components ($Sm_i$) for each of the input measures obtained in step (b), each similarity component being defined by the relationship $$Sm_i = \text{SIGN}(M_i - MIDi) \left| \frac{(M_i - MIDi)}{(HI_i - MIDi)} \right|^m \quad M_i > MIDi$$

$$Sm_i = \text{SIGN}(M_i - MIDi) \left| \frac{M_i - MIDi}{MID_i - LO_i} \right|^m \quad M_i < MIDi$$

where MIDi is approximately the value of the i-th measure at the intersection of the normalized distributions for the i-th measure for verifies and forgeries, where HIi is chosen as a value at which a relatively large preselected percentage of forgeries have a similarity component of less than a preselected maximum, where LOi is chosen as a value at which a relatively large preselected percentage of verifies have a similarity component value greater than a preselected minimum, and where m is a preselected number $\geq 3$;

(d) determining a preliminary similarity measure (Smp) which is the sum of the similarity components of step (c);

(e) determining a similarity measure from the preliminary similarity measure, the similarity measure (SM) being defined as $SM = Smp - REF$ where REF is an individualized small adjustment parameter determined during enrollment by $REF = \overline{Smp} \times SENSITIVITY - EXPECTED$ where the bar over Smp indicates that average input measures for a set of enrollment signatures and standard similarity parameters are used to determine the preliminary similarity measure, sensitivity approximately $= 0.588$ and expected approximately $= 0.0053$; and (f) comparing the similarity measure with a preselected threshold to verify the signature.

17. A machine method of verifying a signature of a putative signer, comprising the steps of:

(a) measuring the rate of change of axial pen pressure and two approximately orthogonal components of acceleration, the acceleration components being a plane parallel to a writing surface, the components and the pressure being produced on a pen by the writing of the signature by the putative signer, the pen producing electrical signals, each respective signal being proportional to the pressure or to one of the acceleration components;

(b) determining input measures ($M_1, M_2, \ldots$) from the rate of change of axial pen pressure and the two approximately orthogonal acceleration components, the input measures comprising: a segment alignment input measure, a pressure correlation input measure, an acceleration correlation input measure, a pressure coherence input measure and an acceleration coherence input measure;

(c) determining similarity components ($Sm_i$) for each of the input measures obtained in step (b), each similarity component being defined by the relationship $$Sm_i = SIGN(M_i - MIDi) \left| \frac{(M_i - MIDi)}{(HI_i - MIDi)} \right|^m \quad M_i > MIDi$$

$$Sm_i = SIGN(M_i - MIDi) \left| \frac{M_i - MIDi}{MID_i - LO_i} \right|^m \quad M_i < MIDi$$

where MIDi is approximately the value of the i-th measure at the intersection of the normalized distributions for the i-th measure for verifies and forgeries, where HIi is chosen as a value at which a relatively large preselected percentage of forgeries have a similarity component of less than a preselected maximum, where LOi is chosen as a value at which a relatively large preselected percentage of verifies have a similarity component value greater than a preselected minimum, and where m is a preselected number $\geq 3$;

(d) determining a preliminary similarity measure (Smp) which is the sum of the similarity components of step (c);

(e) determining a similarity measure from the preliminary similarity measure, the similarity measure (SM) being defined as $SM = Smp - REF$ where REF is an individualized small adjustment parameter determined during enrollment by $REF = \overline{Smp} \cdot SENSITIVITY - EXPECTED$ where the bar over Smp indicates that average input measures for a set of enrollment signatures and standard similarity parameters are used to determine the preliminary similarity measure, sensitivity approximately $= 0.588$ and expected approximately $= 0.0053$; and (f) comparing the similarity measure with a preselected threshold to verify the signature.

* * * * *